United States Patent
Koh (10) Patent No.: US 8,927,266 B2
(45) Date of Patent: Jan. 6, 2015

(54) GARBAGE SEPARATING APPARATUS AND FOOD WASTE DISPOSAL SYSTEM INCLUDING THE SAME

(76) Inventor: Chun Il Koh, Seoul (KR)

(*) Notice: Subject to any disclaimer, the term of this patent is extended or adjusted under 35 U.S.C. 154(b) by 409 days.

(21) Appl. No.: 13/357,599

(22) Filed: Jan. 24, 2012

(65) Prior Publication Data

US 2013/0171725 A1    Jul. 4, 2013

(30) Foreign Application Priority Data

Dec. 30, 2011    (KR) ................. 10-2011-0147086

(51) Int. Cl.
| | |
|---|---|
| C12M 1/00 | (2006.01) |
| C12M 1/02 | (2006.01) |
| C12M 1/10 | (2006.01) |
| C12C 1/15 | (2006.01) |
| C12C 7/06 | (2006.01) |

(52) U.S. Cl.
USPC ............... 435/290.4; 435/289.1; 435/290.1; 435/290.2; 435/291.2

(58) Field of Classification Search
CPC .... C12M 43/08; C05F 17/0258; C05F 17/02; C05F 17/0223; C05F 17/0205; C05F 17/0235
USPC ........................... 435/283.1–309.4
See application file for complete search history.

(56) References Cited

U.S. PATENT DOCUMENTS

| | | | | |
|---|---|---|---|---|
| 3,635,409 A | * | 1/1972 | Brewer | 241/43 |
| 5,566,890 A | * | 10/1996 | Ricciardelli | 241/20 |
| 5,766,935 A | * | 6/1998 | Seagren | 435/290.2 |
| 7,735,761 B2 | | 6/2010 | Koh | |
| 7,762,713 B2 | | 7/2010 | Koh | |
| 2012/0285209 A1 | * | 11/2012 | Bassile | 71/8 |

FOREIGN PATENT DOCUMENTS

| | | |
|---|---|---|
| KR | 200354054 B | 6/2004 |
| KR | 100808132 B | 2/2008 |
| KR | 1020080113686 A | 12/2008 |
| KR | 1020100009139 A | 1/2010 |

\* cited by examiner

*Primary Examiner* — Nathan Bowers
*Assistant Examiner* — Lydia Edwards
(74) *Attorney, Agent, or Firm* — Lee Patent International (57) ABSTRACT

There is provided a garbage separating apparatus including an input unit having an inlet opening through which garbage is input, a crushing unit configured to crush garbage input through the inlet opening, a filtering chamber having an outlet opening and a perforation member provided with a plurality of holes for allowing separation of the garbage crushed by the crushing unit, a food waste collection chamber for accommodating, among the crushed garbage, food waste having passed through the perforation member, and a sweeper device configured to move, among the crushed garbage, impurity garbage remaining on the perforation member to the outlet opening.

8 Claims, 7 Drawing Sheets

GARBAGE SEPARATING APPARATUS AND FOOD WASTE DISPOSAL SYSTEM INCLUDING THE SAME

FIELD OF THE INVENTION

The present disclosure relates to a garbage separating apparatus for separating food waste and impurity garbage and a food waste disposal system including the same.

BACKGROUND OF THE INVENTION

In general, organic waste such as food waste contains a large amount of animal/vegetable cellulose, protein, carbohydrate, calcium, and so forth. Thus, if the organic waste is buried in the ground without decomposed and disposed of, extracts from the organic waste may flow into the ground, contaminating soil, subterranean water and the like.

To prevent this problem, there has been a demand for a food waste disposal system for decomposing and disposing of the organic waste such as food waste.

As one example of conventional food waste disposal system, there is known an apparatus for disposing of food waste or organic waste by making the food waste or organic waste into fertilizer or provender using microorganism, as disclosed in Korean Utility Model Publication No. 20-1994-12627 (FERMENT FERTILIZER'S APPARATUS), Korean Utility Model Publication No. 20-1994-12628 (APPARATUS FOR COMPOST OF ORGANIC MATERIALS), Korean Patent Publication No. 10-1996-4300 (METHOD OF MAKING COMPOST AND FERTILIZER OF FOOD GARBAGE AND PLANT), Korean Utility Model Publication No. 20-1995-7395 (HIGH-SPEED COMPOSTING APPARATUS FOR FOOD GARBAGE) and Korean Utility Model Publication No. 20-1994-24804 (FOOD GARBAGE FERMENTATION APPARATUS), or the like.

Although the above-mentioned conventional methods or apparatuses have an effect of reducing the amount of organic waste, they have following problems. Since it takes a long time to decompose the organic waste, the conventional methods or apparatuses have low processing efficiency. Further, due to low processing power, organic waste yet to be completely decomposed may be discharged out, accompanying noxious gas and offensive odor.

Another example of conventional food waste disposal system is disclosed in Korean Utility Model Registration No. 20-270982 (DECOMPOSITION DEVICE OF ORGANIC WASTE), Korean Patent Publication No. 10-2006-19663 (REFUSE DISPOSAL MACHINE FOR DISH), Korean Patent Registration No. 10-535699 (AGITATION BARREL STRUCTURE IN FOOD WASTE CLEAN SWEEP APPARATUS), or the like.

Among these disclosures, described in Korean Utility Model Registration No. 20-270982 (DECOMPOSITION DEVICE OF ORGANIC WASTE) is an organic waste decomposition device capable of disposing of organic waste at a high speed by using microorganism and heated air. The organic waste decomposition device includes a cylindrical shell case, a shaft, an arm blade, a driving motor and a pre-heater. The cylindrical shell case is fastened to a base frame and stores therein microorganism. The shaft is rotatably fastened to a center of the shell case. The arm blade is coupled to the shaft and is configured to agitate and crush organic waste put into the shell case. The driving motor is configured to provide the shaft with a rotary power, and the pre-heater is configured to pre-heat air supplied into the shell case.

Further, disclosed in Korean Patent Publication No. 10-2006-19663 (REFUSE DISPOSAL MACHINE FOR DISH) is a food waste disposal apparatus including a crushing mill; an agitating and crushing blade provided at a lower part of the crushing mill; and an injection system. In this apparatus, food waste put into a processing vessel through an inlet opening is primarily processed by the crushing mill and then is secondarily processed by the agitating and crushing blade. Accordingly, decomposition time can be shortened, and the inside of the processing vessel can be cleaned by the injection system provided within the processing vessel.

Further, described in Korean Patent No. 10-535699 (AGITATION BARREL STRUCTURE IN FOOD WASTE CLEAN SWEEP APPARATUS) is an agitation barrel structure for use in a food waste disposal apparatus. The agitation barrel structure includes an agitation barrel having a dual structure including an upper bottom with a drain hole and a lower bottom with a drain port; a separable bottom plate coupled to and fixed on the upper bottom of the agitation barrel and having a drain hole; a net provided between the separable bottom plate and the upper bottom; and an agitation blade for agitating food waste input into the agitation barrel. In accordance with this structure, water extracted from the food waste can be drained to the outside through the lower bottom and the agitation port. Further, by replacing the separable bottom plate, the bottom part of the agitation barrel can be easily replaced.

Since, however, the above-mentioned apparatuses in accordance with another conventional example are operated by analogue type manual switch devices, manipulation thereof is inconvenient and it is impossible to select an operation mode among an automatic mode and a manual mode. Further, since it is impossible to inject warm water to the inside of the shell case (agitation barrel), food waste disposal efficiency may be degraded. Moreover, since the inside of the shell case (agitation barrel) cannot be washed clean, offensive odor may be generated.

Apparatuses disclosed in Korean Patent Nos. 10-0808132 (FOOD & DRINK WASTE FOR DESTRUCTION EQUIPMENT), 10-0832785 (A DESTRUCTION SYSTEM EQUIPMENT FOR FOOD & DRINK WASTE), 10-0831380 (FOOD & DRINK WASTE FOR DESTRUCTION EQUIPMENT), which were filed by the present application prior to the filing date of the present application and registered, are designed to solve the aforementioned problems including the problem that decomposition takes a long time and processing efficiency is low, and noxious gas and offensive odor are generated due to the discharge of food waste yet to be completely processed; the problem that manipulation is inconvenient due to analogue type operation and selection of an operation mode (automatic mode or manual) is impossible; and the problem that, since warm water cannot be injected to the inside of the shell case (agitation barrel), a disposal ability is low and offensive odor is generated due to a failure to clean the inside of the shell case (agitation barrel).

However, the above-mentioned patented food waste disposal apparatuses (or disposal system) still have a problem in that it is difficult to satisfy a standard sewage amount set by each nation in draining, as sewage, residues generated after biological decomposition using microorganism is completed. Due to this problem, the apparatuses (or system) may not be available in some countries, and, in such case, an additional apparatus for improving the quality of the sewage is required.

Moreover, in the process of draining decomposed food as sewage, a great amount of water is consumed. In order to set up environment for decomposing food waste effectively, about 4 liters of water is used for each cycle of performing a water supply operation for supplying water into the agitation barrel and a water drain operation for washing away decomposed food as sewage. If this amount is calculated in terms of a daily usage amount, about 400 liters of water may be used. Since usage of such a great amount of water degrades environment-friendliness of the food waste disposal apparatus, there is a demand for a measure to manage water usage effectively.

Meanwhile, a food waste disposal apparatus may be usually used in, e.g., a mega store to dispose of food that has passed the expiration date. Food is usually put on a market while packed. If the packed food is put into the food waste disposable apparatus, packaging waste may cause a disorder of the food waste disposal apparatus. In the present specification, "packaging waste" implies matters thrown away after used in packing food and may include a food container, a packaging material, a buffing material and the like.

Further, not only the packaging waste but also hard material such as seeds in fruits or bones in meats may not be decomposed by microorganism and remain in the food waste disposal apparatus, causing degradation of the processing efficiency of the apparatus or disorder of the apparatus.

In order to prevent these problems, prior to inputting the food waste into the food waste disposal apparatus, an operator needs to remove packaging material or hard matters from the food waste manually. Such a process may impose a burden on the operator and garbage processing time may be increased, resulting in deterioration of garage processing efficiency of the apparatus.

BRIEF SUMMARY OF THE INVENTION

In view of the foregoing, illustrative embodiments provide a food waste separating apparatus capable of sorting input garbage into food waste that can be decomposed and disposed of by microorganism and impurity garbage other that the food waste. Further, illustrative embodiments also provide a food waste disposal system using the food waste separating apparatus and capable of preventing disorder and degradation of disposal efficiency that might be caused by the impurity garbage.

In accordance with one aspect of an illustrative embodiment, there is provided a garbage separating apparatus including an input unit having an inlet opening through which garbage is input, a crushing unit configured to crush garbage input through the inlet opening, a filtering chamber having an outlet opening and a perforation member provided with a plurality of holes for allowing separation of the garbage crushed by the crushing unit, a food waste collection chamber for accommodating, among the crushed garbage, food waste having passed through the perforation member, and a sweeper device configured to move, among the crushed garbage, impurity garbage remaining on the perforation member to the outlet opening.

In accordance with another aspect of an illustrative embodiment, there is provided a food waste disposal system including a food waste separating apparatus configured to sort garbage into food waste and impurity garbage other than the food waste and discharge the sorted garbage, a food waste disposal apparatus configured to decompose and dispose of the discharged food waste by a biological method using microorganism, and a BOD reducing apparatus configured to ferment and decompose wastesoiled water discharged from the food waste disposal apparatus and purifies the wastesoiled water to clean water having a lowered BOD level.

Here, the garbage separating apparatus includes an input unit having an inlet opening through which garbage is input, a crushing unit configured to crush garbage input through the inlet opening, a filtering chamber having an outlet opening and a perforation member provided with a plurality of holes for allowing separation of the garbage crushed by the crushing unit, a food waste collection chamber for accommodating, among the crushed garbage, food waste having passed through the perforation member, and a sweeper device configured to move, among the crushed garbage, impurity garbage remaining on the perforation member to the outlet opening.

In accordance with an illustrative embodiment, the garbage separating apparatus crushes the garbage and sorts the garbage into food waste and impurity garbage other than the food waste by jetting water for sorting to the crushed garbage. The food waste disposal system including this garbage separating apparatus is capable of separating and discharging impurity garbage such as packaging waste, seeds in fruits or bones in meats even if packed garbage or garbage including hard matters are input into the equipment. Thus, in this food waste disposal system, inflow of the impurity garbage into the food waste disposal apparatus can be prevented.

Accordingly, an operator does not need to perform an additional operation for removing the impurity garbage but only needs to input the whole garbage into the disposal equipment. Thus, a burden on the operator can be reduced, and garbage processing time can be reduced, leading to improvement of processing efficiency. In addition, since the impurity garbage can be separately discharged out by the garbage separating apparatus, generation of disorder of the food waste disposal apparatus or degradation of processing efficiency due to the impurity garbage can be avoided.

Furthermore, since the food waste disposal apparatus includes the BOD reducing apparatus, discharge of waste water can be prevented and a usage amount of water can be reduced. Thus, more environment friendly equipment can be achieved.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Hereinafter, illustrative embodiments will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Figure 1:
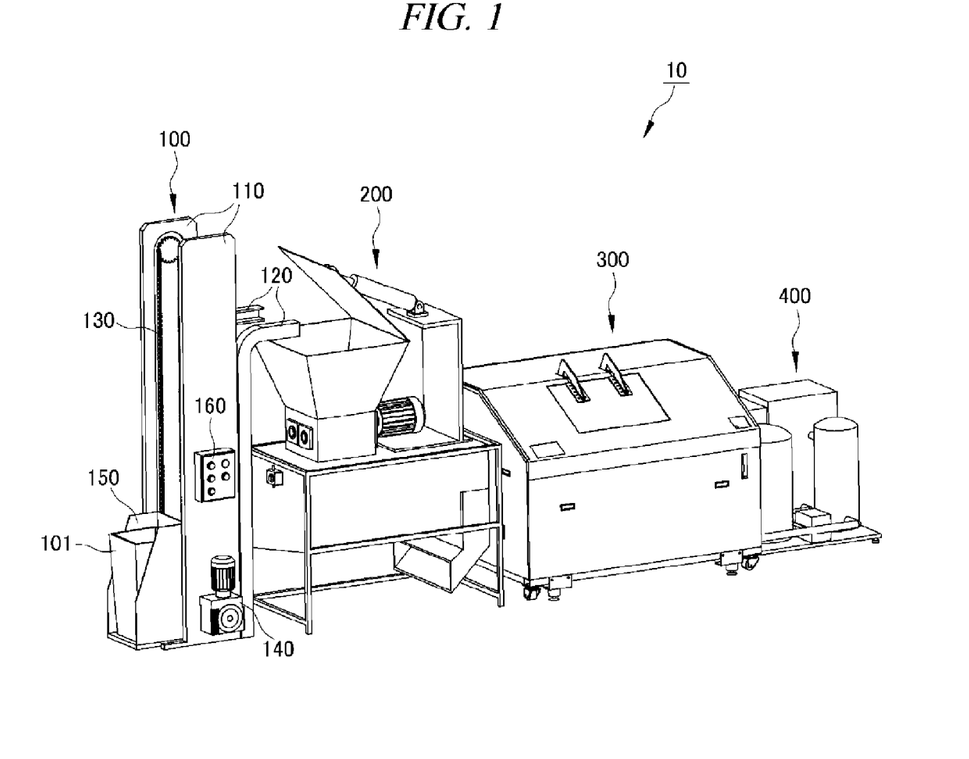
FIG. 1 is a perspective view illustrating a food waste disposal system in accordance with an illustrative embodiment.
Figure 2:
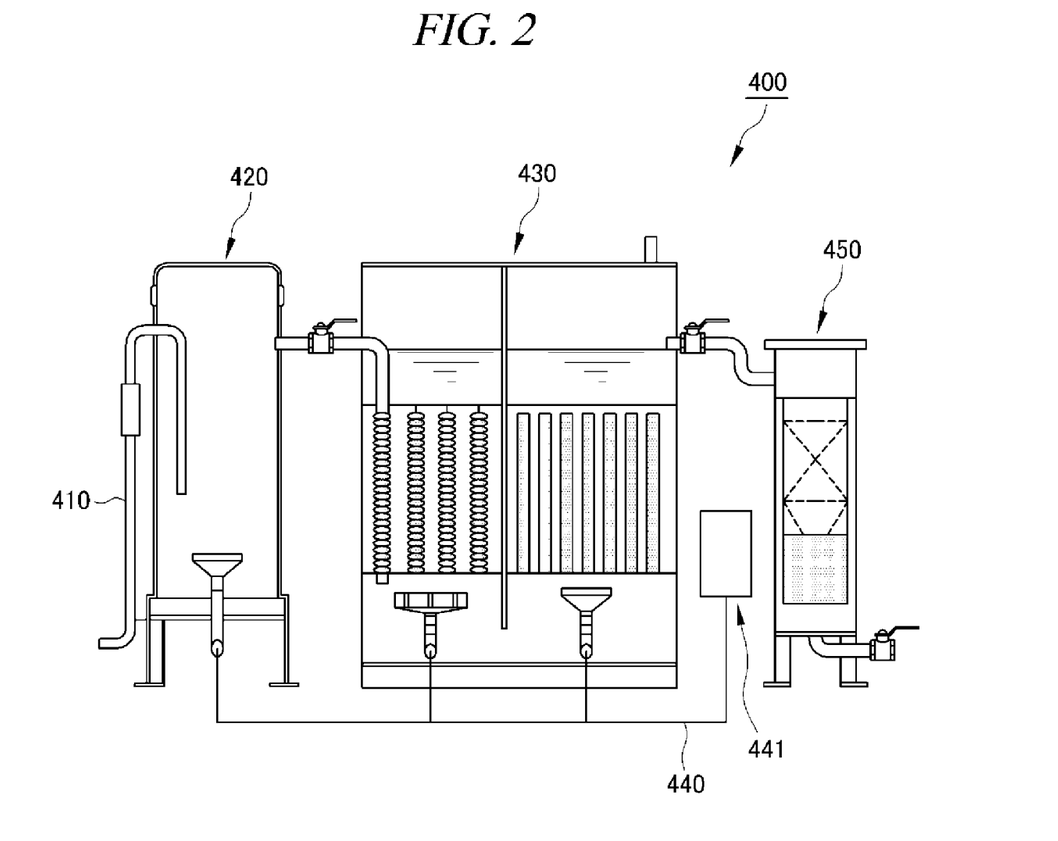
FIG. 2 is a schematic configuration view of a BOD reducing apparatus of FIG. 1.
Figure 3:
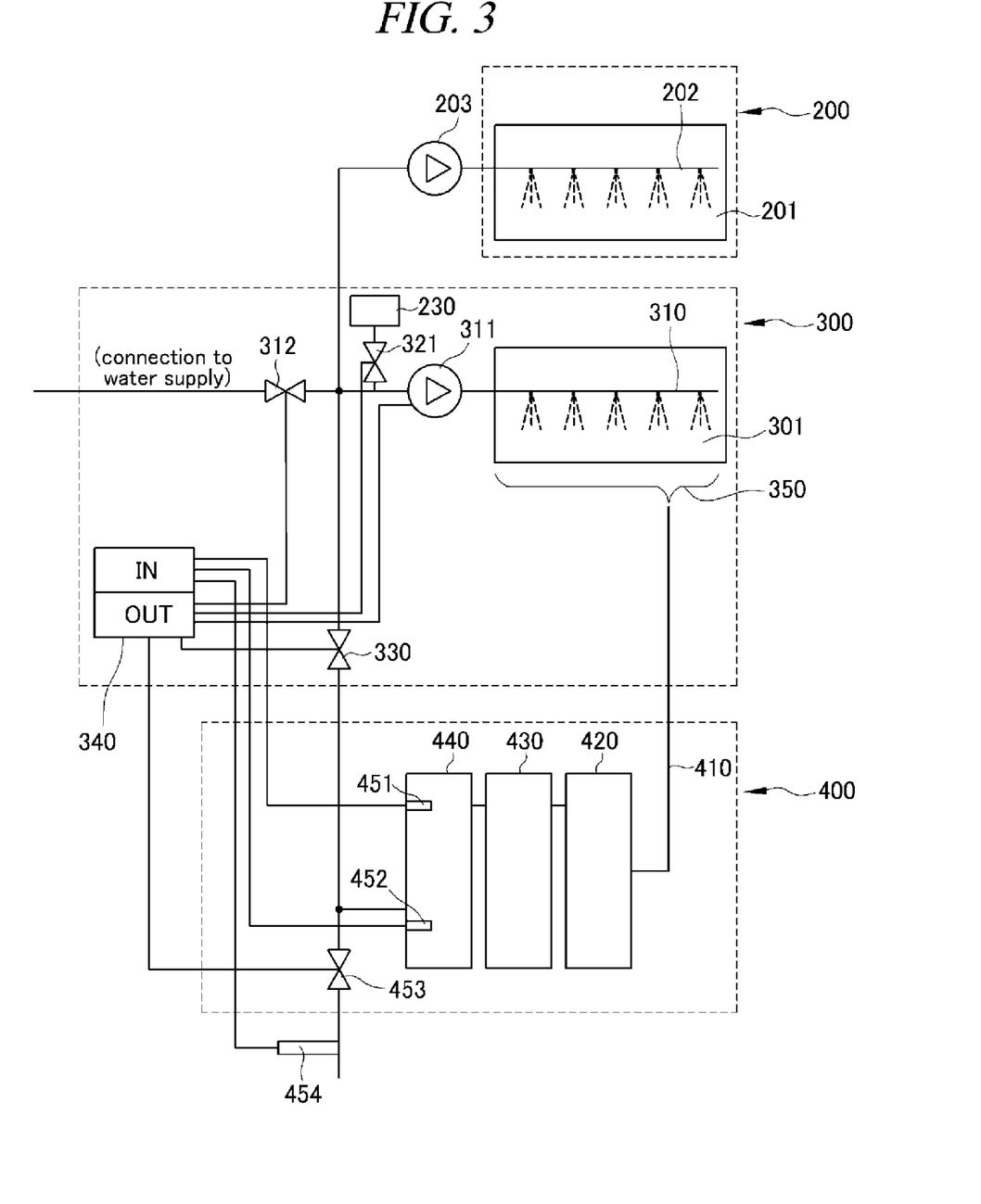
FIG. 3 is a piping diagram illustrating pipelines between a garbage separating apparatus, the food waste disposal system and the BOD reducing apparatus of FIG. 1.

FIG. 1 is a perspective view illustrating a food waste disposal system in accordance with an illustrative embodiment. FIG. 2 is a schematic configuration view illustrating a BOD reducing apparatus of FIG. 1. FIG. 3 is a piping diagram illustrating pipelines between a garbage separating apparatus, a food waste disposal apparatus and the BOD reducing apparatus of FIG. 1.

As depicted in FIG. 1, a food waste disposal system includes a garbage transfer apparatus 100, a garbage separating apparatus 200, a food waste disposal apparatus 300 and a BOD reducing apparatus 400.

If a preset amount or volume of garbage is filled in a garbage collection bin 101, the garbage transfer apparatus 100 moves up the garbage collection bin 101 and tilts it, so that the garbage within the garbage collection bin 101 is transferred into the garbage separating apparatus 200.

The garbage transfer apparatus 100 includes a pair of straight rails 110; curved rails 120; an elevation unit 130; a driving unit 140; a lift 150 and a controller 160. The pair of straight rails 110 are fastened to one side of the garbage separating apparatus 200 and uprightly installed in a vertical direction. The curved rails 120 are curved from straight sections parallel to the straight rails 110 toward the garbage separating apparatus 200. The elevation unit 130 is fastened inside the straight rails 110, and the driving unit 140 is configured to transmit a motive power for moving the elevation unit 130 up and down. The lift 150 is disposed between the pair of straight rails 110, fastened to the elevation unit 130 and coupled to the garbage collection bin 101. The controller 160 is configured to control, in response to a manual input from a user, the vertical movement of the lift 150 based on the manual input from the user or the volume or the weight of the garbage collection bin 101.

One example of the garbage transfer apparatus 100 may be an organic waste automatic input apparatus disclosed in Korean Patent No. 10-0511614 (Announcement data: 2005.08.31) registered by the present application.

The garbage separating apparatus 200 separates the garbage transferred by the garbage transfer apparatus 100 into food waste and impurity garbage other than the food waste. Then, the garbage separating apparatus 200 discharges the separated garbage.

For reference, garbage may be sorted into food waste and impurity garbage. The food waste is organic waste that can be decomposed by microorganism, whereas the impurity garbage is matters that cannot be decomposed by microorganism or are harder than the food waste.

The garbage separating apparatus 200 crushes the garbage transferred by the garbage transfer apparatus 100; jets water for sorting to the crushed garbage; filters food waste having relatively low hardness using a jet force of the water for sorting; and discharges the food waste into the food waste disposal apparatus 300. Meanwhile, the impurity garbage having higher hardness than that of the food waste is not filtered even when the water for sorting is jetted. The unfiltered impurity garbage is discharged out of the garbage separating apparatus separately from the food waste.

The garbage separating apparatus 200 will be described later in further detail.

The food waste disposal apparatus 300 decomposes and disposes of the food waste discharged from the garbage separating apparatus 200 by a biological method using microorganism.

To elaborate, the food waste disposal apparatus 300 agitates the food waste input from the garbage separating apparatus 200 while supplying, to the food waste, heat and water, chemical or microorganism for decomposing and drying the food waste. While agitated, the food waste is crushed into small particles, and, thus, it becomes easier to decompose and dry the food waste. While the food waste is agitated and dried together with the chemical or microorganism, matters such as protein, lipid, carbohydrate, fatty acid, cellulose and the like are decomposed by the microorganism, and ammonia, carbon dioxide and the like are decomposed by biodegradable matters. Further, mineral salts such as phosphorous and calcium are decomposed by recalcitrant matters.

One example of the food waste disposal apparatus 300 is disclosed in Korean Patent Nos. 10-0808132, 10-0832785 and 10-0831380 registered by the present applicant.

Meanwhile, waste water is generated from the food waste disposal apparatus 300 due to water contained in the food waste or water supplied to the food waste together with the chemical or microorganism. The food waste disposal apparatus 300 discharges the waste water to the BOD reducing apparatus 400.

The BOD reducing apparatus 400 ferments and decomposes the waste water discharged from the food waste disposal apparatus 300 and purifies the waste water into clean water of a lowered BOD (Biological Oxygen Demand: biologically required oxygen amount). The BOD reducing apparatus was disclosed in U.S. patent application Ser. No. 13/337,039 by the present applicant and a brief explanation of it will be introduced in following description.

As shown in FIG. 2, the BOD reducing apparatus 400 includes a concentration oxidation tank 420; an aeration tank 430; an air pump 441; and a filter 450. The concentration oxidation tank 420 stores therein the waste water, which is introduced from the food waste disposal apparatus 300 through a waste water inlet pipe 410 connected with the food waste disposal apparatus 300, for a preset period of time (e.g., several days). The aeration tank 430 mixes the waste water from the concentration oxidation tank 320 with activated sludge, adsorbs organic material from the waste water and performs oxidation decomposing of the organic material, thus purifying the waste water. The air pump 441 supplies air to the concentration oxidation tank 420 and the aeration tank 430 through an air line 440. The filter 450 filters the waste water partially purified by the aeration tank 430 by allowing the partially purified waste water to pass through a multiple number of filter layers composed of sand, small pebbles, pebbles, charcoal, glass wool, and so forth. Here, the filter 450 temporarily stores there clean water purified by the concentration oxidation tank 420, the aeration tank 430 and the multiple number of filter layers.

At this time, the BOD reducing apparatus 400 is capable of reducing a BOD level of the waste water by about 1000 BOD level.

One example of the BOD reducing apparatus 400 is disclosed in Korean Patent Application No. 10-2011-0119269 filed by the present applicant prior to the filing of the present application.

Meanwhile, the clean water purified by the BOD reducing apparatus 400 can be supplied to the garbage separating apparatus 200 and the food waste disposal apparatus 300 through pipelines (not shown) connected between each of the garbage separating apparatus 200 and the food waste disposal apparatus 300 and the BOD reducing apparatus 400.

That is, as depicted in FIG. 3, the food waste disposal apparatus 300 includes an agitation barrel 301; a water supply injection nozzle 310; a water supply pump 311; water supply valve 312; microorganism/chemical tank 320; microorganism supply valve 321; and a reuse water supply pump 330. The agitation barrel 301 agitates food waste introduced therein. The water supply injection nozzle 310 supplies water for decomposing and disposing of the food waste. The water supply pump 311 increases a hydraulic pressure of water that is supplied to the water supply injection nozzle 310. The water supply valve 312 is provided between waterworks and the water supply pump 311 and is connected to the water supply injection nozzle 310 via the water supply pump 311. The water supply valve 312 is opened and closed to start and stop the supply of water using the waterworks. The microorganism/chemical tank 320 stores microorganism or chemical therein. The microorganism supply valve 321 is provided between the microorganism/chemical tank 320 and the water supply pump 311 to start and stop the supply of the microorganism or chemical. The reuse water supply pump 330 is provided between the BOD reducing apparatus 400 and the water supply pump 311 and serves to start and stop the supply of water for water supply using the clean water from the BOD reducing apparatus 400.

The food waste disposal apparatus 300 further includes a PLC controller 340 configured to control an opening/closing operation of each of the water supply valve 312 and the reuse water supply pump 330 based on an amount of the clean water stored in the filter 450 of the BOD reducing apparatus 400.

With this configuration, the food garbage disposal apparatus 300 receives water from either one of the waterworks and the BOD reducing apparatus 400 and discharges waste water generated during a food garbage disposal process to the BOD reducing apparatus 400.

As stated earlier, the BOD reducing apparatus 400 includes the concentration oxidation tank 420 into which the waste water is introduced through a water drain port 350 of the food waste disposal apparatus 300; the aeration tank 430 that purifies a part of the waste water; and the filter 450 that filters the partially purified waste water and stores the purified clean water therein.

The BOD reducing apparatus 400 may further include a high water-level sensor 451 and a low water-level sensor 452 provided upstream and downstream of the filter 450, respectively; a final water drain valve 453 for discharging the clean water stored in the filter 45 to the outside without reusing it; and a pH sensor 454 for measuring acidity/basicity of the clean water discharged to the outside through the final water drain valve 453.

The PLC controller 340 controls an opening/closing operation of the final water drain valve 453 and an opening/closing operation of the reuse water supply pump 330 based on measurement results of the high water-level sensor 451, the low water-level sensor 452 and the pH sensor 454, thus allowing an appropriate amount of clean water to be stored in the filter 450.

Besides, the garbage separating apparatus 200 includes a filtering chamber 210; a water supply unit 202 and a pump 203 for sorting. The filtering chamber 201 filters garbage that has been crushed one time after transferred by the garbage transfer apparatus 100. The water supply unit 202 supplies water for sorting to the garbage within the filtering chamber 201. The pump 203 for sorting serves to increase a hydraulic pressure of the water for sorting supplied to the water supply unit 202. Here, the pump 203 for sorting is disposed between the water supply unit 202 and each of the water supply valve 312 and the reuse water supply pump 330.

In this configuration, the garbage separating apparatus 200 receives water for sorting from either one of the waterworks and the BOD reducing apparatus 400.

In this way, since clean water purified by the BOD reducing apparatus 400, not waste water, is discharged to the outside, it is possible to satisfy a water purify standard required by each nation, and an amount of water consumed in the food waste disposal system 10 can be reduced. Thus, the equipment can be made more environment-friendly.

Now, referring to FIGS. 4 to 6, the garbage separating apparatus of FIG. 1 will be explained in further detail.

Figure 4:
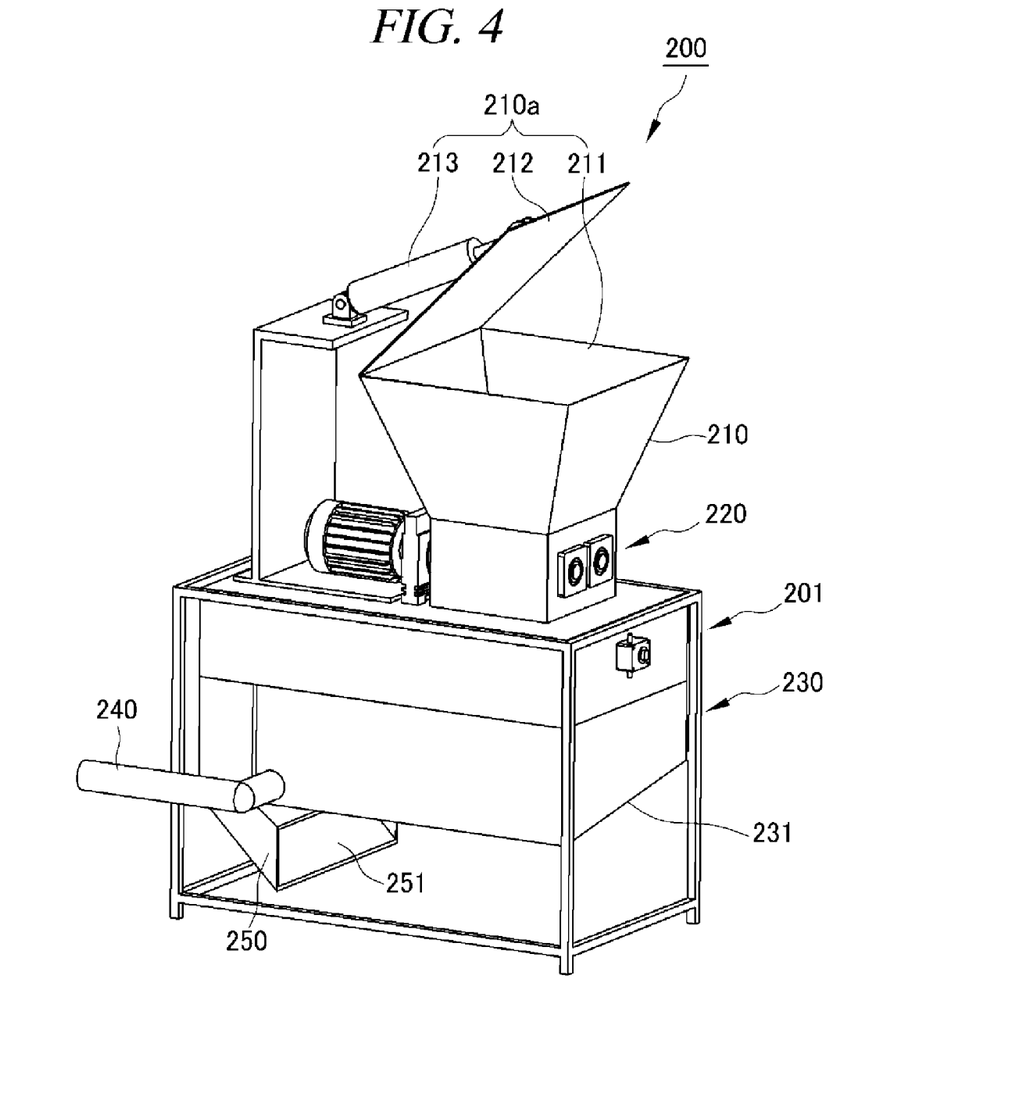
FIG. 4 is a perspective view illustrating a garbage separating apparatus of FIG. 1.

As depicted in FIG. 4, the garbage separating apparatus 200 includes a housing 210, input unit 210a, a crushing unit 220, a filtering chamber 201, a food waste collection chamber 230, a food waste outlet pipe 240 and an impurity outlet pipe 250.

The input unit 210a includes an inlet opening 211 through which garbage is input; an inlet opening cover 212 placed on top of the inlet opening 211 so as to open and close the inlet opening 211; and an opening/closing cylinder 214 configured to drive an opening/closing operation of the inlet opening cover.

In this configuration, the garbage transferred by the garbage transfer apparatus 100 is input into the housing 210 through the inlet opening 211.

The crushing unit 220, the filtering chamber 201 and the food waste collection chamber 230 are disposed under the inlet opening 211 in sequence.

That is, the crushing unit 220 is positioned under the inlet opening 211 and crushes the garbage input through the inlet opening 211.

The filtering chamber 201 is positioned under the crushing unit 220. The garbage crushed by the crushing unit 220 is introduced into the filtering chamber 201. Further, though not shown in FIG. 4, the filtering chamber 201 has a bottom surface provided with a perforation member 260 and an outlet opening 252. The perforation member 260 is provided with a multiple number of holes allowing separation of the garbage crushed by the crushing unit 220. With this configuration, the filtering chamber 201 filters the crushed garbage.

That is, the food waste is discharged into the food waste collection chamber 230 under the filtering chamber 201 through the perforation member 260 of the filtering chamber 201. Impurity garbage may not pass through the perforation member 260 of the filtering chamber 201 but remains on the perforation member 260. Accordingly, the crushed garbage is sorted by the filtering chamber 201 into food waste and impurity garbage.

The food waste collection chamber 230 is placed under the filtering chamber 201 and accommodates the food waste introduced therein through the filtering chamber 201.

The food waste outlet pipe 240 is a pipeline connected with the food waste collection chamber 230 and discharges the food waste accommodated in the food waste collection chamber 230 to the outside of the food waste collection chamber 230. Especially, the food waste outlet pipe 240 is positioned between the food waste collection chamber 230 and the food waste disposal system (300 in FIG. 1) so as to transfer the food waste to the agitation barrel (301 in FIG. 3) of the food waste disposal apparatus 300.

A bottom surface of the food waste collection chamber 230 is inclined toward the food waste outlet pipe 240. That is, by forming the bottom surface of the food waste collection chamber 230 as the inclined surface, an area of the food waste collection chamber 230 adjacent to the food waste outlet pipe 240 is positioned lower than the other area of the food waste collection chamber 230.

With this configuration, the food waste stored in the food waste collection chamber 230 can be guided into the food waste outlet pipe 240 along the inclined bottom surface of the food waste collection chamber 230. Thus, the amount of food waste remaining in the food waste collection chamber 230 can be reduced.

Figure 5:
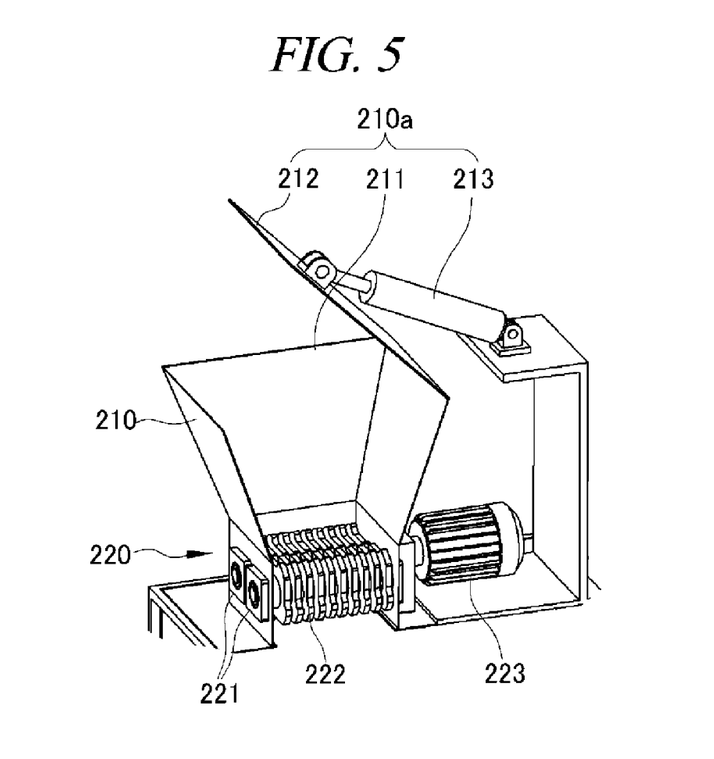
FIG. 5 illustrates an input unit and a crushing unit of FIG. 4.

As illustrated in FIG. 5, the crushing unit 220 includes a pair of rotation shafts 221 disposed in parallel to each other; a pair of gears 222 provided at outer peripheries of the pair of rotation shafts; and a driving motor 233 configured to rotate the pair of gears 222.

Here, the pair of gears 222 are rotated while engaged with each other, whereby the garbage input into the crushing unit is crushed.

A crushing force of the crushing unit 220 for crushing the garbage may be set to be of a level at which it is possible to separate, e.g., food and packaging waste for wrapping the food from each other or to separate a seed from a fruit or a bone from a meat.

The crushing unit 220 crushes the garbage into particles having a size larger than the size of the holes in the perforation member of the filtering chamber 201. That is, an average particle size of the crushed garbage is larger than the size of the holes in the perforation member. Accordingly, it can be prevented that both the food waste and the impurity garbage included in the crushed garbage pass through the filtering chamber 201 and are introduced into the food waste collection chamber 230.

Figure 6:
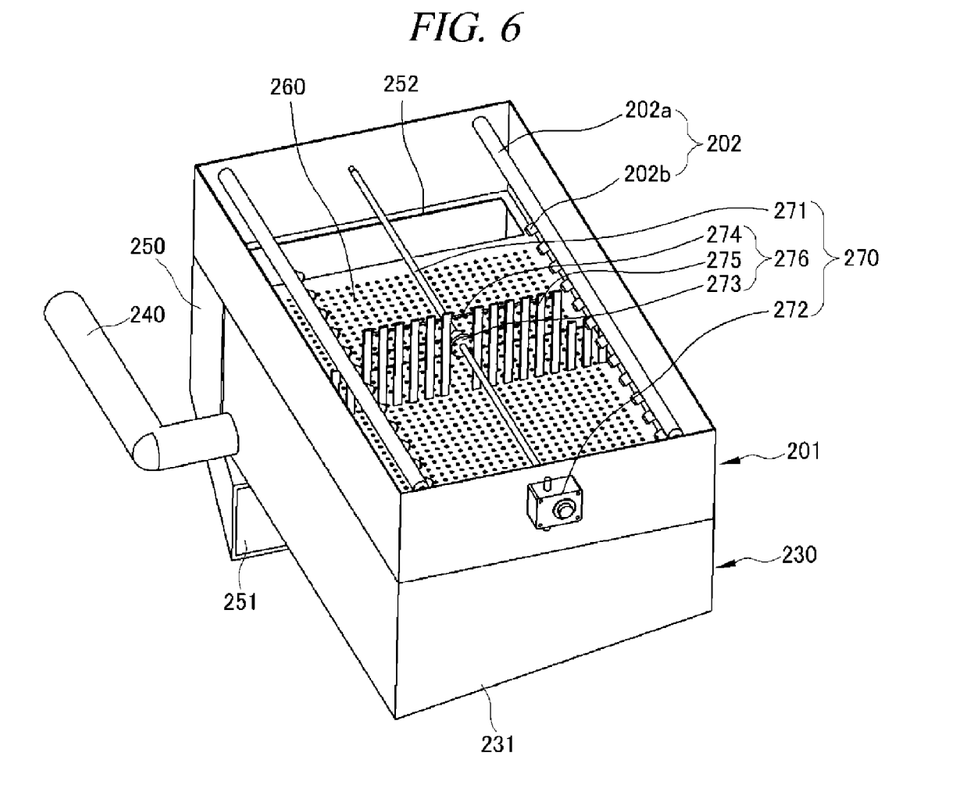
FIG. 6 illustrates the inside of a filtering chamber of FIG. 4.

As shown in FIG. 6, the filtering chamber 201 includes the perforation member 260 and the outlet opening 252 at the bottom surface thereof.

The perforation member 260 is provided with the multiple number of holes each having a small size so as not to allow the crushed garbage to pass therethrough. The crushed garbage can be sorted by this perforation member 260.

The outlet opening 252 is opened so as to allow the impurity garbage to be discharged therethrough. The outlet opening 252 is connected with the impurity outlet pipe 250.

The garbage separating apparatus 200 further includes a water supply unit 202 and a sweeper d 270 provided within the filtering chamber 201.

The water supply unit 202 is positioned above the perforation member 260 and jets water for sorting to the garbage placed on the perforation member 260.

The water supply unit 202 includes a water supply pipe 202a into which water for sorting is supplied; and a multiple number of injection nozzles 202b provided at the water supply pipe 202a.

As mentioned above, the water supply pipe 202a is connected with the water supply valve (312 of FIG. 3) and the reuse water supply pump (330 of FIG. 3) and receives the water for sorting from either one of the waterworks and the BOD reducing apparatus (400 in FIG. 3).

The multiple number of injection nozzles 202b are provided at a part of the water supply pipe 202a corresponding to the perforation member 260. The injection nozzles 202b jet the water for sorting to the crushed garbage on the perforation member 260.

Due to the hydraulic pressure of the water for sorting jetted from the multiple number of injection nozzles 202b, the food waste having relatively low hardness among the crushed garbage on the perforation member 260 is allowed to pass through the perforation member 260 easily. Meanwhile, among the crushed garbage on the perforation member 260, the impurity garbage having higher hardness than that of the food waste may not be softened or crushed into small particles by the hydraulic pressure of the water for sorting. Accordingly, the impurity garbage is filtered out by the perforation member 260 and remains on the perforation member 260.

The sweeper device 270 is provided above the perforation member 270. The sweeper device 270 sweeps the impurity garbage remaining on the perforation member 270 and transfers the impurity garbage into the outlet opening 252.

To elaborate, the sweeper device 270 includes a sweeper moving slide bar 271, a sweeper moving motor 272 and sweeper unit 276.

The sweeper moving slide bar 271 is placed across the perforation member 260 and the outlet opening 252 within the filtering chamber 201. That is, the sweeper moving slide bar 271 is of a bar shape crossing the inside of the filtering chamber 201 in one direction. Here, the sweeper moving slide bar 271 may be parallel to the water supply pipe 202a.

The sweeper moving motor 272 is connected to one end of the sweeper moving slide bar 271 and rotates the sweeper moving slide bar 271.

The sweeper unit 276 is moved along the sweeper moving slide bar 271 as the sweeper moving slide bar 271 is rotated. The sweeper unit 276 includes a sweeper moving hook 273, a connection bar 274 and one or more sweeping bars 275.

The sweeper moving hook 273 is fitted and fastened to the sweeper moving slide bar 271. If the sweeper moving slide bar 271 is rotated, the sweeper moving hook 273 is moved along the sweeper moving slide bar 271. For example, if the sweeper moving slide bar 271 is rotated in clockwise direction, the sweeper moving hook 273 is moved toward the sweeper moving motor 272. To the contrary, if the sweeper moving slide bar 271 is rotated in counterclockwise direction, the sweeper moving hook 273 is moved away from the sweeper moving motor 272.

The connection bar 274 is fixed to the sweeper moving hook 273 so as to intersect the sweeper moving slide bar 271 orthogonally. That is, the connection bar 274 has a bar shape crossing the inside of the filtering chamber 201 in a direction perpendicular to the sweeper moving slide bar 271.

The one or more sweeping bars 275 are fixed to the connection bar 274 and arranged side by side along the connection bar 274.

The one or more sweeping bars 275 are installed so as to be spaced apart from the perforation member 260 at a preset gap. The preset gap between the perforation member 260 and the one or more sweeping bars 275 is smaller than the particle size of the crushed garbage. Accordingly, the impurity garbage remaining on the perforation member 260 is swept by the one or more sweeping bars 275 to the outlet opening 252. The impurity garbage sent to the outlet opening 252 is introduced into the impurity outlet pipe 250 and discharged out of the filtering chamber 201 through a final outlet port 251.

Here, the sweeping bar 275 may have a rake shape.

The one or more sweeping bars 275 are formed so as to correspond to the perforation member 260. Accordingly, the impurity garbage accumulated on the entire surface of the perforation member 260 can be moved by the movement of one or more sweeping bars 275.

Meanwhile, the food waste disposal system 10 of FIG. 1 includes the garbage transfer apparatus 100, the garbage separating apparatus 200, the food waste disposal apparatus 300 and the BOD reducing apparatus 400 arranged side by side in a row.

Figure 7:
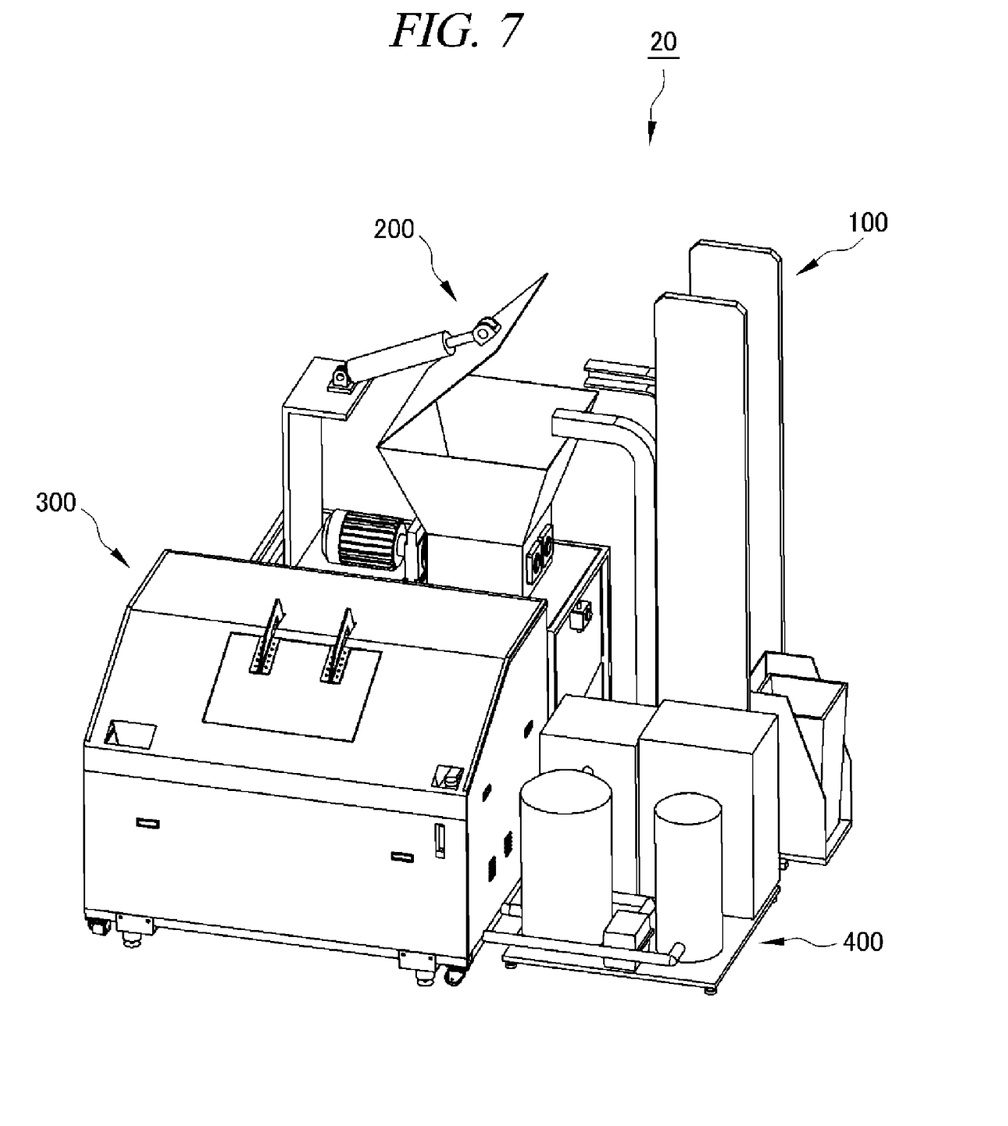
FIG. 7 is a perspective view illustrating a food waste disposal system in accordance with another illustrative embodiment.

However, in accordance with another illustrative embodiment as shown in FIG. 7, a food waste disposal system 20 may include a garbage transfer apparatus 100, a garbage separating apparatus 200, a food waste disposal apparatus 300 and a BOD reducing apparatus 400 arranged in a matrix pattern. In this configuration, density between the garbage transfer apparatus 100, the garbage separating apparatus 200, the food waste disposal apparatus 300 and the BOD reducing apparatus 400, and space efficiency can be improved. Thus, space efficiency can be improved and, when installing the apparatus 20, restriction in space can be reduced.

As stated above, the food waste disposal systems 10 and 20 in accordance with the illustrative embodiments include the garbage separating apparatus 200. Thus, garbage can be sorted into biologically decomposable food waste and impurity garbage other than the food waste, and the separated food waste can be supplied to the food waste disposal apparatus 300. That is, even if packed garbage or garbage containing a hard material is input, the impurity garbage such as packaging waste, seeds of fruits or bones of meats can be prevented from being introduced into the food waste disposal apparatus 300.

Accordingly, even if a process of removing the impurity garbage from the whole garbage is omitted, it is possible to prevent disorder or degradation in processing efficiency of the rood garbage disposal apparatus 300 due to the impurity garbage. Accordingly, a burden on an operator can be reduced, and garbage processing time can also be reduced. As a consequence, processing efficiency can be improved.

Further, since the BOD reducing apparatus 400 is additionally included, water once used in the garbage separating apparatus 200 and the food waste disposal apparatus 300 can be reused. Thus, waste water of a high BOD level is not discharged and water usage can be reduced. As a consequence, the apparatus can be made more environment-friendly.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A food waste disposal system comprising:
    a garbage transfer apparatus to move up a garbage collection bin;
    a garbage separating apparatus configured to sort garbage into food waste and impurity garbage other than the food waste and discharge the sorted garbage;
    a food waste disposal apparatus configured to decompose and dispose of the discharged food waste by a biological method using microorganism; and
    a BOD, Biochemical Oxygen Demand, reducing apparatus configured to ferment and decompose waste water discharged from the food waste disposal apparatus and purifies the waste water to clean water having a lowered BOD level,
    wherein the garbage separating apparatus comprises:
        an input unit having an inlet opening through which garbage is input;
        a crushing unit configured to crush garbage input through the inlet opening;
        a filtering chamber having an outlet opening and a perforation member provided with a plurality of holes for allowing separation of the garbage crushed by the crushing unit;
        a food waste collection chamber for accommodating, among the crushed garbage, food waste having passed through the perforation member
        a sweeper device configured to move, among the crushed garbage so that impurity garbage remaining on the perforation member is swept to the outlet opening; and
        a water supply unit provided above the perforation member and configured to supply water for sorting to the crushed garbage on the perforation member;
    wherein a water supply pipe is connected with the BOD reducing apparatus and receives the clean water from the BOD reducing apparatus,
    wherein each of the plurality of holes is formed to have a size smaller than a particle size of the crushed garbage.

2. The food waste disposal system of claim 1, wherein the water supply unit comprises:
    a water supply pipe into which the water for sorting is supplied; and
    an injection nozzle fastened to the water supply pipe and configured to jet the water for sorting to the crushed garbage on the perforation member.

3. The food waste disposal system of claim 1, wherein the crushing unit comprises:
    a pair of rotation shafts arranged in parallel to each other;
    a pair of gears formed at outer peripheries of the pair of rotation shafts, respectively, and engaged with each other so as to crush the garbage; and
    a driving motor configured to rotate the pair of gears;
    wherein the crushing unit separates food and packaging waste for wrapping a food from each other or to separate a seed from a fruit or a bone from a meat.

4. The food waste disposal system of claim 1, wherein the sweeper device comprises:
    a sweeper moving slide bar placed across the perforation member and the outlet opening within the filtering chamber;
    a sweeper moving motor configured to rotate the sweeper moving slide bar; and
    a sweeper unit configured to be moved along the sweeper moving slide bar as the sweeper moving slide bar is rotated.

5. The food waste disposal system of claim 4, wherein the sweeper unit comprises:
    a sweeper moving hook fastened to the sweeper moving slide bar;
    a connection bar fastened to the sweeper moving hook so as to intersect the sweeper moving slide bar orthogonally; and one or more sweeping bars fastened to the connection bar and arranged side by side along the connection bar, wherein the one or more sweeping bars are spaced apart from the perforation member at a preset gap, and the preset gap is set to be smaller than the particle size of the crushed garbage.

6. The food waste disposal system of claim 1, further comprising:

a food waste outlet pipe which is connected to the food waste collection chamber and through which the food waste accommodated in the food waste collection chamber is discharged, wherein a bottom surface of the food waste collection chamber is inclined toward the food waste outlet pipe.

7. The food waste disposal system of claim 1, wherein the input unit further comprises:

an inlet opening cover placed on top of the inlet opening so as to open and close the inlet opening; and an opening/closing cylinder configured to hydraulically drive an opening/closing operation of the inlet opening cover.

8. The food waste disposal system of claim 1, further comprising:

a garbage transfer apparatus configured to transfer the garbage into the inlet opening of the garbage separating apparatus by vertically moving a garbage collection bin for accommodating the garbage therein.

* * * * *